(12) United States Patent
Weissman et al.

(10) Patent No.: US 9,450,623 B2
(45) Date of Patent: Sep. 20, 2016

(54) NOISE CANCELER FOR USE IN A TRANSCEIVER

(71) Applicant: QUALCOMM Incorporated, San Diego, CA (US)

(72) Inventors: Haim Mendel Weissman, Haifa (IL); Avigdor Brillant, Zichron Ya'akov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/491,851

(22) Filed: Sep. 19, 2014

(65) Prior Publication Data

US 2016/0087658 A1   Mar. 24, 2016

(51) Int. Cl.
*H04B 1/44* (2006.01)
*H04B 1/10* (2006.01)

(52) U.S. Cl.
CPC ..................... *H04B 1/10* (2013.01)

(58) Field of Classification Search
CPC .......... H04B 1/525; H04B 1/48; H04B 1/44; H04W 16/14; H04W 28/04
USPC ................. 455/78, 63.1, 63.11, 67.11, 67.13
See application file for complete search history.

(56) References Cited

U.S. PATENT DOCUMENTS

| | | | | |
|---|---|---|---|---|
| 7,058,368 | B2* | 6/2006 | Nicholls | H04B 1/525 375/296 |
| 8,325,632 | B2* | 12/2012 | Gorbachov | H04B 1/48 343/835 |
| 2004/0120418 | A1* | 6/2004 | Pasternak | H01Q 1/125 375/272 |
| 2008/0207259 | A1* | 8/2008 | Rofougaran | H04B 1/126 455/552.1 |
| 2013/0309975 | A1* | 11/2013 | Kpodzo | H04B 1/1027 455/63.1 |
| 2014/0087671 | A1* | 3/2014 | Mostov | H03F 1/0227 455/78 |

* cited by examiner

*Primary Examiner* — April G Gonzales
(74) *Attorney, Agent, or Firm* — Procopio, Cory, Hargreaves & Savitch, LLP

(57) ABSTRACT

A noise canceler for use in a transceiver is disclosed. In an exemplary embodiment, an apparatus includes a split amplifier to output an amplified transmit signal, the split amplifier providing a first noise attenuation factor in a receive band. The apparatus also includes a transmit antenna to transmit the amplified transmit signal, the transmit antenna being isolated from a receive antenna by an antenna isolation factor that provides a second noise attenuation factor in the receive band. The apparatus also includes a noise canceler configured to subtract a detection signal from a received signal to obtain an adjusted received signal, wherein subtraction of the detection signal provides a third noise attenuation factor in the receive band, and wherein the first, second, and third noise attenuation factors combine to provide a selected amount of noise attenuation in the receive band.

19 Claims, 9 Drawing Sheets

Frequency (MHz)

US 9,450,623 B2

NOISE CANCELER FOR USE IN A TRANSCEIVER

BACKGROUND INFORMATION

1. Technical Field

The disclosed embodiments relate generally to wireless communication systems, and more particularly, to power amplifiers and noise cancellation techniques used in radio front end circuitry for up-converting and down-converting transmission signals.

2. Background Information

Signals transmitted by a transceiver device may be received by a receive path of the transceiver device. Reception of transmit signals increases the receiver's noise floor and therefore reduces the receiver's sensitivity.

Conventional radio frequency (RF) front-ends utilize a single front-end filter for the transmit (Tx) path and a single front-end filter for the receive (Rx) path. The filter in the Tx path typically has strong rejection to remove out-of-band (Tx) noise that may leak into the Rx path. This Tx filter has relatively high insertion loss to support sharp rejection and the gain of the transmitter's power amplifier and its P1 dB are relatively high to compensate for the insertion loss of filter.

The Rx path also includes an Rx filter that has strong rejection to remove out-of-band Tx power and harmonics that may leak into the Rx path. The Rx filter has relatively high insertion loss to support sharp rejection thus increasing the Rx noise floor. The Rx path also includes a low noise amplifier (LNA) with relatively high gain to compensate the filter insertion loss and to achieve good noise figure. As a result, conventional solutions to address the problems of out-of-band Tx noise leaking into the Rx path utilize filters for both the Tx and Rx paths which result in a significant noise floor penalty in the Rx path and higher gain and power at the Tx path, resulting in increased power consumption, and high parts count.

Therefore, it is desirable to have noise canceler for use in a transceiver to reduce the amount of Tx noise leaking into the Rx path while overcoming the problems associated with conventional systems.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
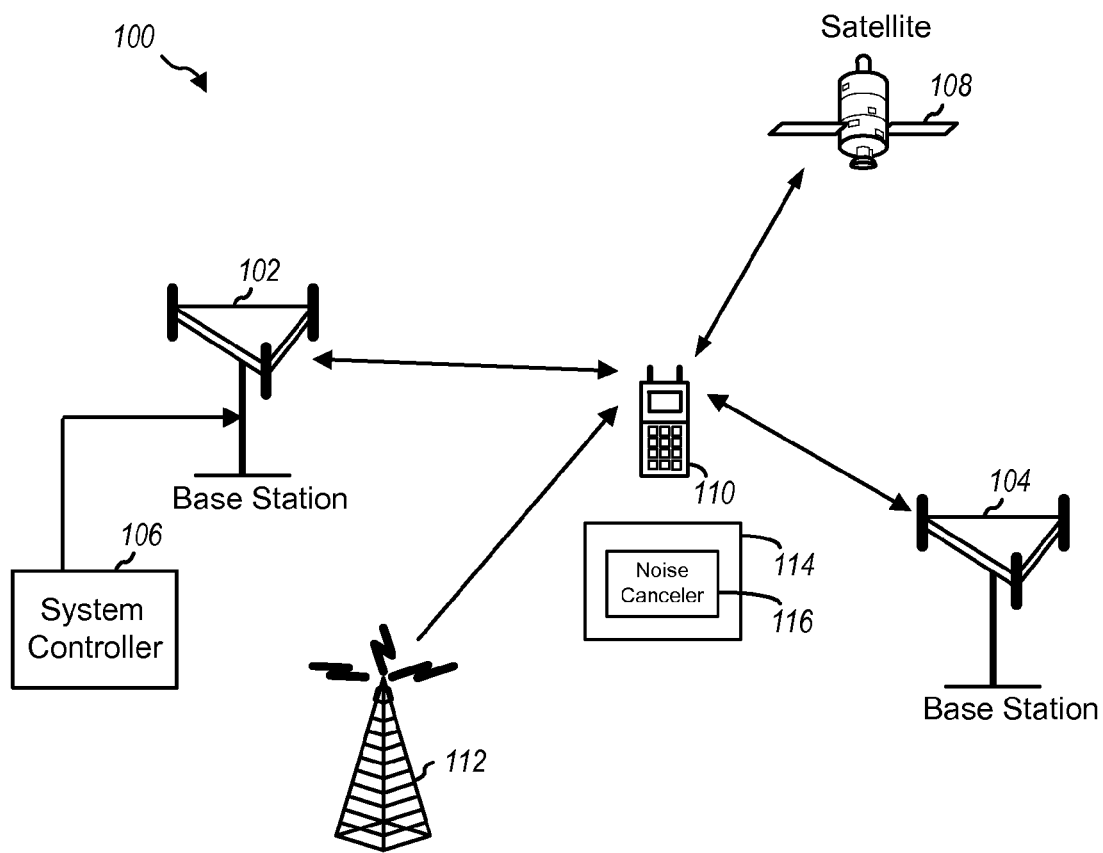
FIG. 1 shows an exemplary embodiment of noise canceler in a wireless device communicating in a wireless communication system.

FIG. 1 shows a wireless device 110 communicating in a wireless communication system 100. Wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (ENDO), Time Division Synchronous CDMA (TD-SCDMA), or some other version of CDMA. For simplicity, FIG. 1 shows wireless system 100 including two base stations 102 and 104 and one system controller 106. In general, the wireless communication system 100 may include any number of base stations, Femto cells, Pico cells and/or any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a hand-held device, a laptop computer, a smartbook, a netbook, a cordless phone, a wireless local loop (WLL) station, a Bluetooth device, etc. Wireless device 110 may also receive signals from broadcast stations (e.g., a broadcast station 112), or signals from satellites (e.g., a satellite 108) in one or more global navigation satellite systems (GNSS), etc. Wireless device 110 may support one or more radio technologies for wireless communication such as LTE, WCDMA, CDMA 1x, EVDO, TD-SCDMA, GSM, 802.11, etc.

Wireless device 110 includes a transceiver 114 having an exemplary embodiment of the noise canceler 116. The transceiver 114 includes one or more transmit circuits that are configured to transmit signals over one or more transmit frequencies. The transceiver 114 also includes one or more receive circuits that are configured to receive signals over one or more receive frequencies. During operation, out-of-band Tx signals may leak into a receive signal path and desensitize the receiver. In exemplary embodiments disclosed herein, a noise canceler 116 operates at the transceiver to reduce, minimize, or eliminate out-of-band Tx signals that may leak into the receive signal path and desensitize the receiver.

Figure 2:
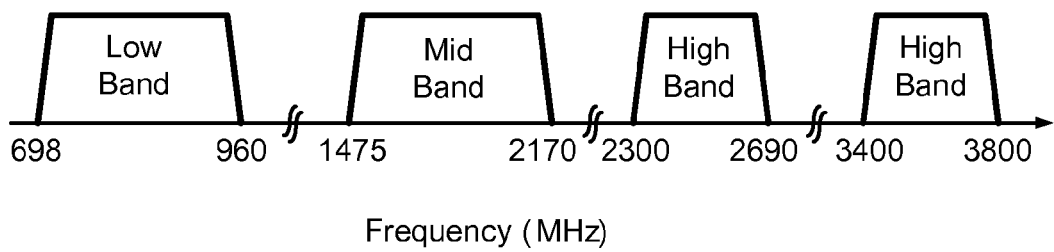
FIG. 2 shows exemplary frequency band groups in which the noise canceler of FIG. 1 is configured to operate.

FIG. 2 shows three exemplary band groups that may be supported by wireless device 110. Wireless device 110 may be able to operate in a low-band (LB) covering frequencies lower than 1000 megahertz (MHz), a mid-band (MB) covering frequencies from 1000 MHz to 2300 MHz, and/or a high-band (HB) covering frequencies higher than 2300 MHz. For example, the low-band may cover 698 to 960 MHz, the mid-band may cover 1475 to 2170 MHz, and the high-band may cover 2300 to 2690 MHz and 3400 to 3800 MHz, as shown in FIG. 2. The low-band, mid-band, and high-band refer to three groups of bands for band groups), with each band group including a number of frequency bands (or simply, "bands"). Each band may cover up to 200 MHz. LTE Release 11 supports 35 bands, which are referred to as LTE/UMTS bands and are listed in 3GPP TS 36.101.

In general, any number of band groups may be defined. Each band group may cover any range of frequencies, which may or may not match any of the frequency ranges shown in FIG. 2. Each band group may also include any number of bands. In various exemplary embodiments, the noise canceler 116 is suitable for use with transmitters and receivers operating in any of the bands shown in FIG. 2.

Figure 3:
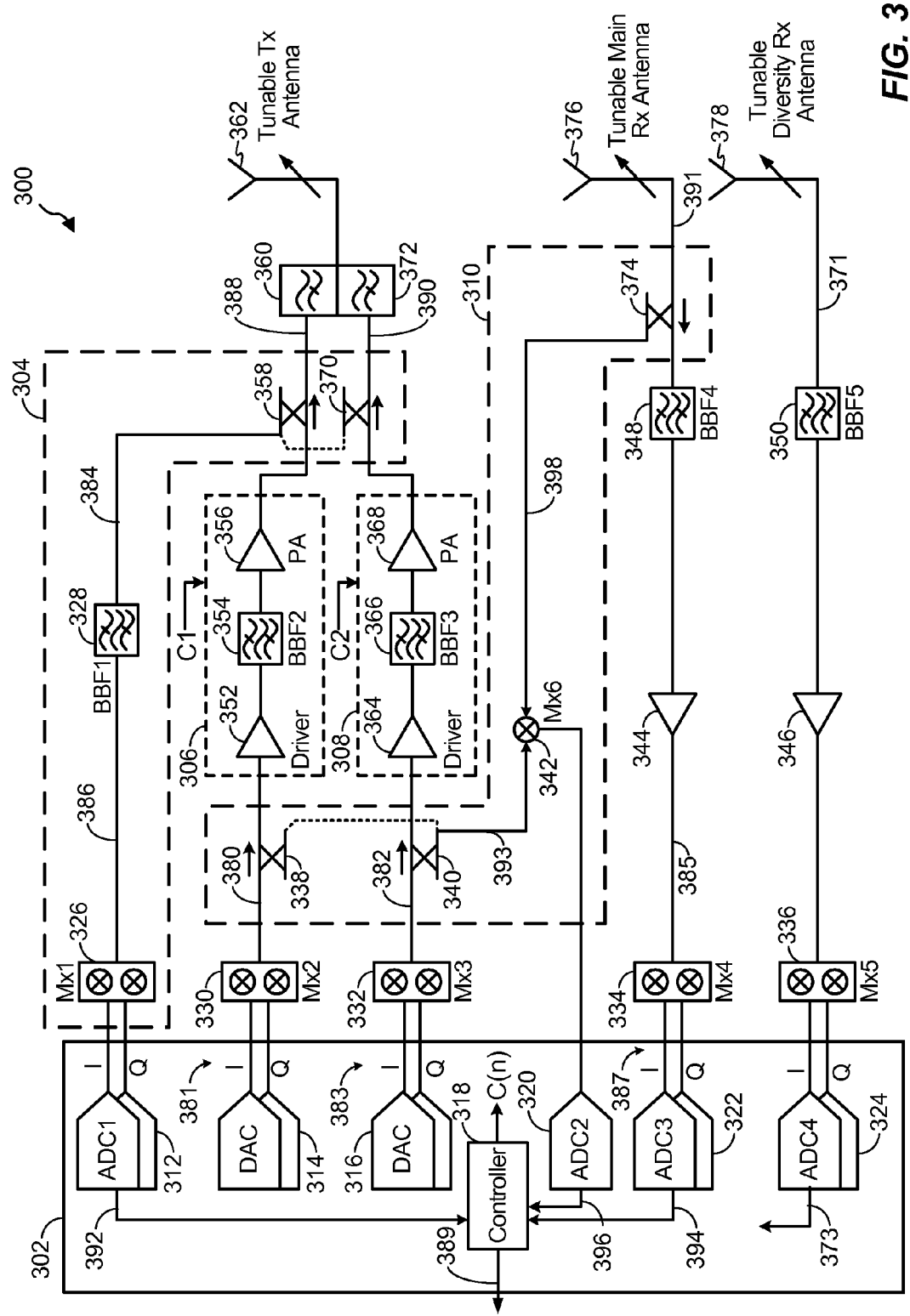
FIG. 3 shows a block diagram of a mobile communication device comprising an exemplary embodiment of a noise canceler.

FIG. 3 shows a block diagram of a mobile communication device 300 comprising an exemplary embodiment of a noise canceler. For example, the noise canceler is suitable for use as the noise canceler 116 shown in FIG. 1. In this example, mobile communication device 300 is a cellular telephone and includes (among several other components not illustrated) a tunable transmit antenna 362, a tunable receive antenna. 376, and a baseband circuit 302 also referred to as a "digital baseband integrated circuit." The noise canceler comprises a first split Power Amplifier (PA) 306, a second split PA 308, a first feedback circuit 304, a second feedback circuit 310, and a controller 318.

First Split Power Amplifier

The first split power amplifier 306 comprises driver amplifier 352, filter 354, and power amplifier 356. The first split power amplifier 306 operates to receive an RF transmit signal 380 at the input of the driver amplifier 352. The driver amplifier 352 provides a first amplification factor to the RF transmit signal 380 to generate an amplified RF transmit signal that is input to the filter 354. The filter 354 operates to filter the amplified RF transmit signal to remove out-of-band noise to generate a filtered amplified RF transmit signal. In an exemplary embodiment, the filter 354 is a bandpass filter and has a center frequency centered on the transmit band and thus operates to remove or reduce out-of-band noise.

The filtered amplified RF transmit signal is input to the power amplifier 356. The power amplifier 356 provides a second amplification factor to the filtered amplified RF transmit signal to generate an amplified RF output signal 388. The amplified RF output signal 388 has reduced out-of-band noise due to removal of out-of-band noise by the operation of the filter 354. The amplified RF output signal 388 is suitable for transmission by the tunable transmit antenna 362. In an exemplary embodiment, the controller 318 outputs control signals (C(n)) that operate to set the first and second amplification factors. For example, in an exemplary embodiment, the first amplification factor is set by the control signal C1 so that the driver amplifier 352 provides a gain of 20 dB. The second amp amplification factor is set by the control signal C1 so that the power amplifier 356 provides a gain of 10 dB. However, the control signal C1 can set the first and second amplification factors to any desired values. It should be also noted that the fitter 354 has an insertion loss of approximately 1.5 dB.

Thus, the first split power amplifier 306 operates to split the amplification of the RF transmit signal 380 between the driver amplifier 352 and the power amplifier 356. The location of the filter 354 in between the amplifiers results in reduced out-of-band noise in the amplified output signal 388.

Second Split Power Amplifier

The second split power amplifier 308 comprises driver amplifier 364, filter 366, and power amplifier 368. The second split power amplifier 306 operates to receive an RF transmit signal 382 at the input of the driver amplifier 364. The driver amplifier 364 provides a first amplification factor to the RF transmit signal 382 to generate an amplified RF transmit signal that is input to the filter 366. The filter 366 operates to filter the amplified RF transmit signal to remove out-of-band noise to generate a filtered amplified RF transmit signal. In an exemplary embodiment, the filter 366 is a bandpass filter and has a center frequency centered on the transmit band and thus operates to remove or reduce out-of-band noise.

The filtered amplified RF transmit signal is input to the power amplifier 368. The power amplifier 368 provides a second amplification factor to the filtered amplified RF transmit signal to generate an amplified RF output signal 390. The amplified RF output signal 390 has reduced out-of-band noise due to the operation of the filter 366. The amplified RF output signal 390 is suitable for transmission by the tunable transmit antenna 362. In an exemplary embodiment, the controller 318 outputs control signals (C(n)) that operate to set the first and second amplification factors. For example, in an exemplary embodiment, the first amplification factor is set by the control signal C2 so that the driver amplifier 364 provides a gain of 20 dB. The second amp amplification factor is set by the control signal C2 so that the power amplifier 368 provides a gain of 10 dB. However, the control signal C2 can set the first and second amplification factors to any desired values. It should be also noted that the filter 366 has an insertion loss of approximately 1.5 dB.

Thus, the second split power amplifier 308 operates to split the amplification of the RF transmit signal 382 between the driver amplifier 364 and the power amplifier 368. The location of the filter 366 in between the amplifiers results in reduced out-of-band noise in the amplified output signal 390.

First Feedback Circuit

The first feedback circuit 304 comprises directional signal couplers 358, 370, filter 328 and mixer 326. The first feedback circuit 304 operates to generate a first feedback signal 392 based on a coupled version of the amplified output signals 388 and 390.

The directional couplers 358, 370 are coupled to the signals lines between the outputs of the split PAs 306, 308, and the diplexer 360. The diplexer 360 couples the amplified output signals 338 and 390 to the tunable antenna 362, in various exemplary embodiments, the diplexer has an insertion loss of approximately 1.5 dB. The directional couplers 358, 370 provide a coupled version 384 of the Tx and Tx noise signals of the first and second RF output signals 388, 390. The coupled version 384 is input to the filter 328. The filter 328 operates to filter the coupled version 384 to provide a filtered signal 386 which is the Tx noise only while rejecting the Tx signal itself. The filtered signal 386 is input to the mixer 326, which down-converts the filtered signal 386 to generate I and Q signals that are digitized by the ADC 312 to generate the first feedback signal 392.

Second Feedback Circuit

The second feedback circuit 310 comprises directional signal couplers 338, 340, and 374, and mixer 342. The second feedback circuit 310 operates to provide a second feedback signal 396 based on coupled versions of the RF transmit signals 380, 382 and a coupled signal 398 coupled from a received signal 391.

The directional couplers 338, 340 are coupled to the signals lines between the outputs of the mixers 330, 332 and the split PAs 306, 308. The directional couplers 338, 340 provide a coupled version 393 of the first and second RF transmit signals 380, 382 and this coupled version is input to the mixer 342. The directional coupler 374 is coupled to the signal line between the tunable receive antenna 376 and the filter 348. The directional coupler 374 provides a coupled signal 398 that is input to the mixer 342. The mixer 342 operates to mix the coupled signal 393 and the coupled signal 398 to generate an analog signal that is digitized by the ADC 320 to create the second digital feedback signal 396.

During operation, the baseband circuit 302 generates baseband transmit signals 381 comprising in-phase signals (I) and quadrature signals (Q). A pair of digital-to-analog converters (DAC) 314 converts the digital I and Q signals into analog baseband I and Q transmit signals 381. The analog I and Q baseband transmit signals 381 are up-converted by mixer circuits 330 to generate the first RF transmit signal 380 which is input to the first split PA 306. As described above, the RF transmit signal 380 is amplified by the driver amplifier 352. The amplified RF transmit signal output by driver amplifier 352 is filtered by the filter 354. The filtered output is amplified by the PA 356 to generate the amplified output signal 388.

In an exemplary embodiment, the filter 354 is a bandpass filter centered at the desired transmission frequency so that Tx noise from the driver amplifier 352 is reduced and therefore the Tx noise and spectral regrowth can be optimized and minimized. The operation of the filter 354 therefore relaxes the filtering requirements on the amplified output signal 388, since out of band noise is greatly reduced prior to the operation of the power amplifier 356.

A coupled version of the amplified RF output signal 388 output from the power amplifier 356 is coupled to filter 328 by the directional coupler 358. The directional coupler 358 operates to couple to the filter 328 a version of the signals flowing between the power amplifier 356 and the diplexer 360. However, signals received by transmit antenna 362 that flow through the diplexer 360 toward the power amplifier 356 are attenuated since this is the isolation path of the coupler 358. Furthermore, the transmit antenna 362 is tuned to match the transmit band so that signals outside of this band are also filtered from flowing back through the diplexer 360. Moreover, any signals received by the Tx antenna 362 are filtered and when impinging the output of the PA 356 so that the Tx-Rx intermodulation distortion (IMD) is minimized. This prevent supplying other ambient signals to filter 328.

Filter 328 filters the signal at its input to provide the filtered output 386. In an exemplary embodiment, the filter 328 is a bandpass filter centered at a receive frequency thus it rejects the Tx signal and transfers the Tx noise. The filtered signal 386 output by filter 328 is down-converted from RF to analog baseband by I/Q mixer 326. The down-converted analog baseband feedback signal is converted to a digital feedback signal by pair of ADCs 312 to generate the first digital feedback signal 392 that is input to a controller 318.

As discussed in greater detail below, the controller 318 operates to perform noise canceling in the exemplary embodiments.

The noise canceler described above can support multiple transmitters in a UE, in an exemplary embodiment, second I and Q baseband transmit signals 383 are output from the DAC pair 316 and are up-converted by I/Q mixer 332 to form the RF transmit signal 382, which is amplified by driver amplifier 364, filtered by filter 366, and amplified by power amplifier 368. The operation of the first feedback circuit 304 to process the amplified RF output signal 390 is the same as described with reference to the amplified RF output signal 388. Accordingly, the noise canceler architecture can be expanded to operate with multiple transmitters (using multiple split PAs) to generate the first feedback signal 392. Similarly, additional couplers (like coupler 340) can be used as part of the second feedback circuit 310 to generate the second feedback signal 396 from multiple transmit circuits.

Simultaneously, an RF receive signal 391 is received by tunable receiver antenna 376. The RF receive signal 391 is filtered by filter 348. In one example, filter 348 is a bandpass filter centered at the middle of the receive frequency range. The filtered receive signal output by filter 348 is amplified by amplifier circuit 344 to generate an amplified RF receive signal 385 that is output by amplifier 344 and down-converted to analog baseband by mixer 334. The analog baseband receive signal 387 output by mixer 334 is converted to a digital receive signal 394 by ADC 322. The digital receive signal 394 is received by the controller 318. In various exemplary embodiments, the controller 318 operates to perform noise canceling as described herein to generate an adjusted receive signal 389. The controller 318 also operates to output control signals (C(n)) that control the operations amplifiers, switches, filters, and any other adjustable components of the noise canceler.

In an exemplary embodiment, the controller 318 operates to subtract the feedback signal 392 from the received signal 394 to obtain an adjusted signal 389 having at least 20 dB reduction of noise in the receive band. Noise cancellation is obtained through a combination of a attenuation factors where the split PA 306 provides a first noise attenuation factor, the isolation of the transmit antenna 362 from the receive antenna 376 provides a second noise attenuation factor, and the subtraction of the feedback signal 392 from the received signal 394 provides a third noise attenuation factor. In an exemplary embodiment, the first, second, and third noise attenuation factors combine to provide a selected amount of noise attenuation in the receive band, in an exemplary embodiment, the combined noise attenuation in the receive band is at least 20 db. It should also be noted that the filters 354, 328 and diplexers 360, 372 have an insertion loss of approximately 1.5 dB. This results in the total insertion loss of devices connected between the output of the split amplifier 306 (e.g., output of PA 356) and the transmit antenna 362 being less than approximately 2 dB.

In an exemplary embodiment, a similar configuration is used to generate a received signal 373 to the controller 318 based on processing a diversity receive signal 371 from the diversity antenna 378. Canceling of noise from the diversity received signal 373 can be performed in the same way as described with reference to the receive signal 394. Many of the signals described with reference to FIG. 3 are described in greater detail with respect to FIG. 4.

Figure 4:
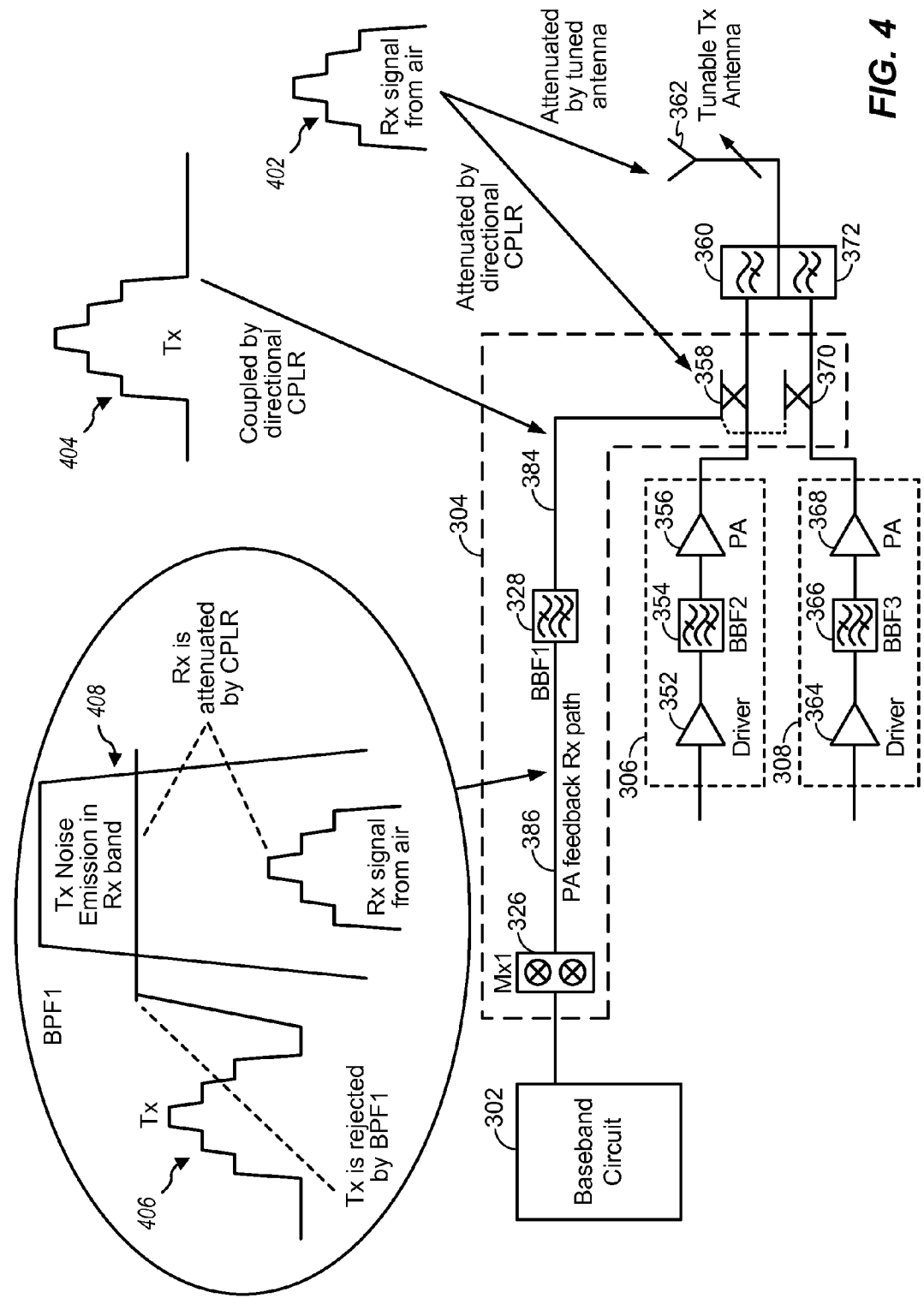
FIG. 4 shows exemplary operation of a first feedback circuit that is part of the noise canceler shown in FIG. 3.

FIG. 4 shows exemplary operation of the first feedback circuit 304. As illustrated in FIG. 4, Rx signals 402 received on the transmit antenna 362 are greatly attenuated by tuning of the tuned transmit antenna 362. The directional couplers 358 and 370 also attenuate any received Rx signals that flow through the diplexer 360 due to coupler directivity. The resulting coupled signal 404 on the isolation path 384 comprises mainly energy output from the PA 356 and some small amount of Rx energy that may pass through the coupler 358 onto the isolation path 384. In an exemplary embodiment, the filter 328 is a bandpass filter centered at the receive frequency. The filter 328 operates to reject the majority of the transmit energy located within the transmit band, as shown at 406. The filter 328 includes a pass band 408 that passes Tx noise in the Rx band that is output from the PA 356 as out-of-band noise. The filter 328 may also pass any Rx signal that flows through the coupler 358, although this Rx signal is attenuated by the coupler 358 and has a very low level.

Figure 5:
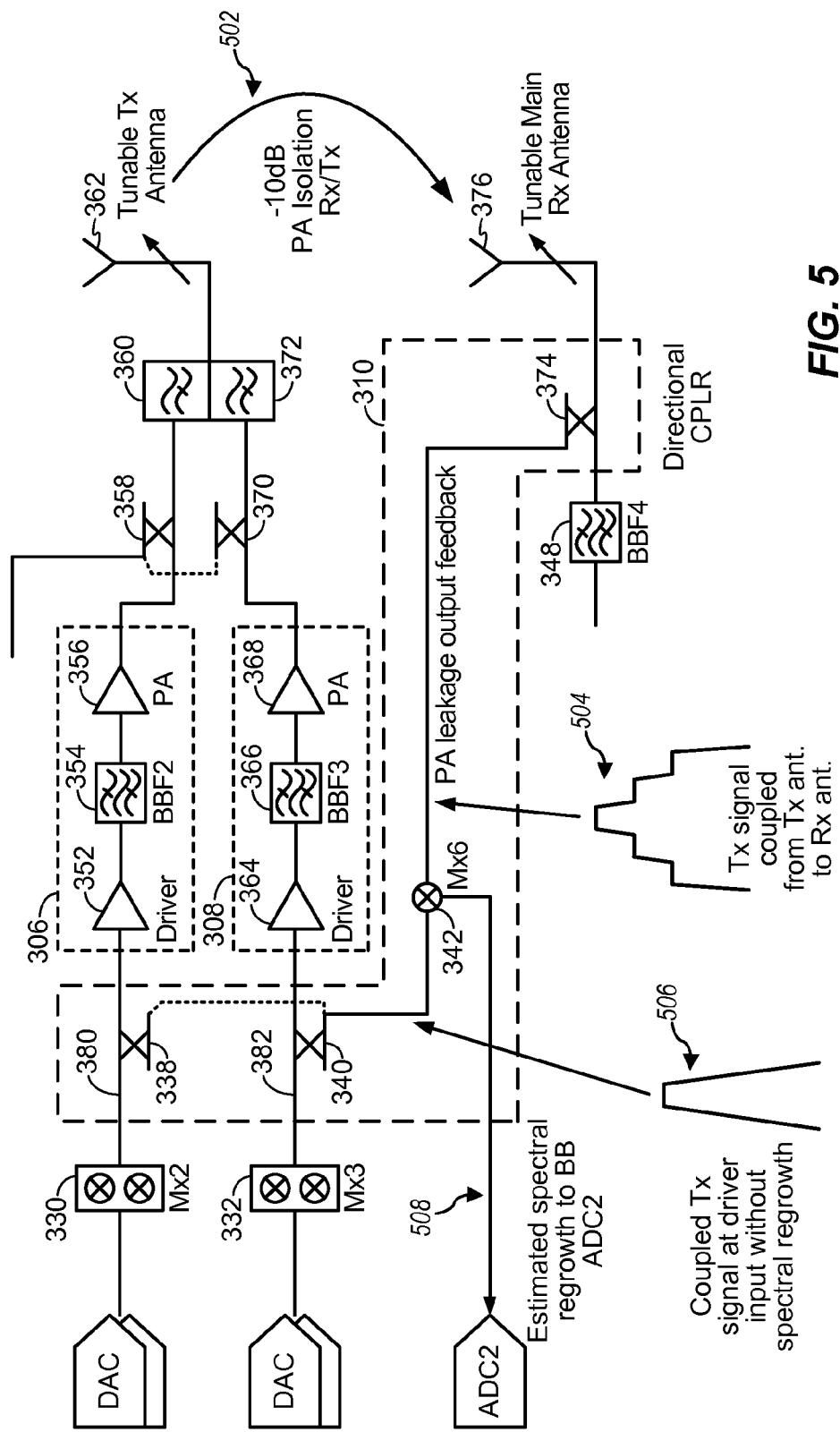
FIG. 5 shows exemplary operation of a second feedback circuit that is part of the noise canceler shown in FIG. 3.

FIG. 5 shows exemplary operation of the second feedback circuit 310. As illustrated in FIG. 5, antenna isolation 502 between the transmit antenna 362 and the receive antenna 376 is approximately 10 dB. In an exemplary embodiment, a transmit signal received by the receive antenna 376 is coupled via directional coupler 374 to mixer circuit 342. The up-converted transmit signals 380, 382 without spectral regrowth are coupled to mixer circuit 342 via directional couplers 338 and 340 respectively. The output of mixer circuit 342 provides an estimate as to the spectral regrowth that is input to baseband circuit 302. For example, a Tx signal received by the Rx antenna and coupled by the coupler is shown at 504. A coupled Tx signal without spectral regrowth is shown at 506. The output of the mixer 342 is an estimate of the spectral regrowth 508 that is provided to the baseband circuit 302. In an exemplary embodiment, the controller 318 operates to subtract the estimated spectral regrowth 508 from the received Rx signal 394 to cancel Rx distortion on the received Rx signal 394 or to cancel Rx distortion on the output Tx spectrum.

Figure 6:
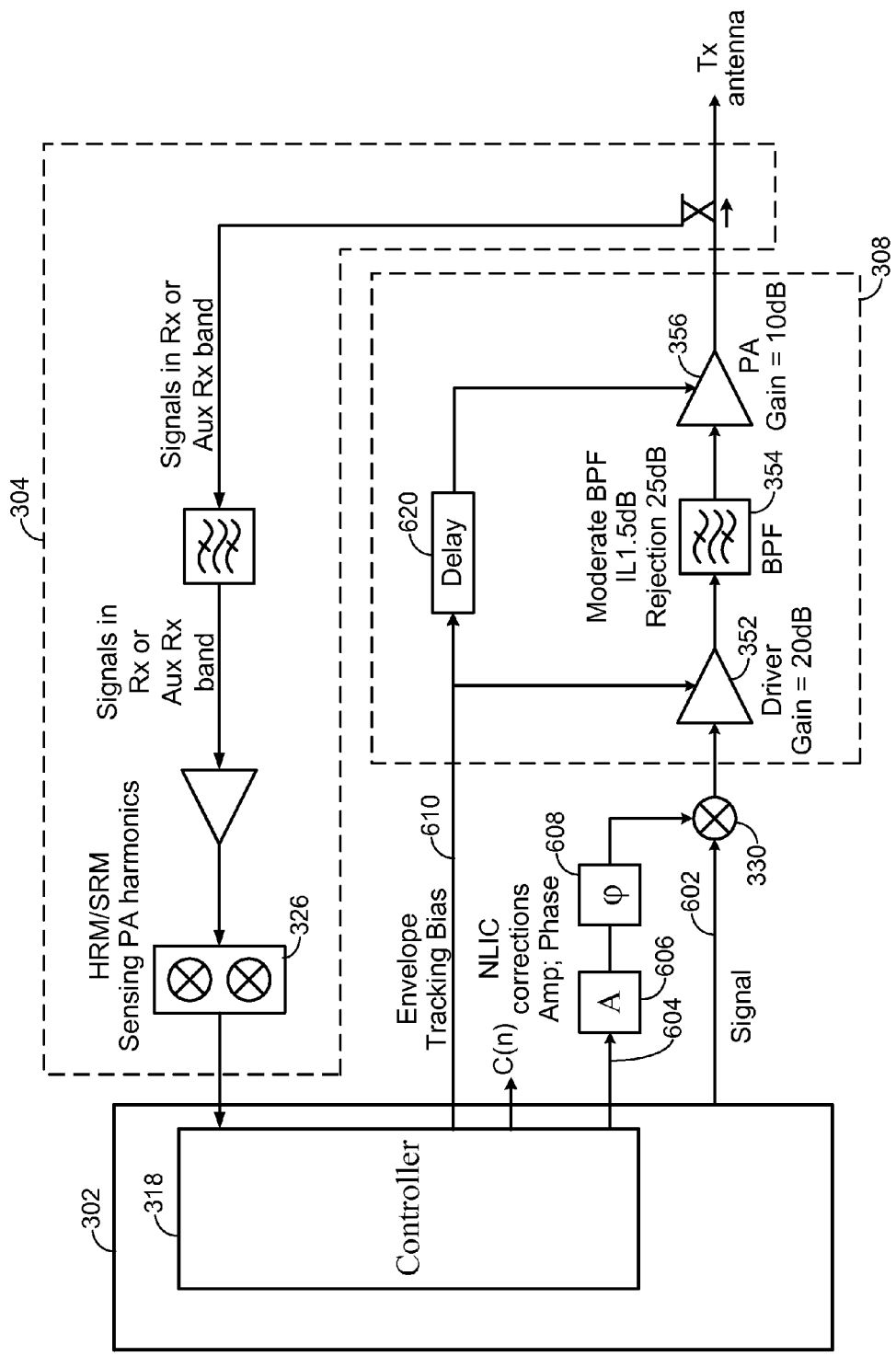
FIG. 6 shows an exemplary embodiment of adjustment circuits used to adjust the operation of the split PA to compensate for spectral regrowth and non-linearities.

FIG. 6 shows an exemplary embodiment of adjustment circuits used to adjust the operation of the split PA to compensate for spectral regrowth and non-linearities. In response to receiving the spectral regrowth signal, the controller 318 performs power amplifier mask optimization. Power amplifier mask optimization is adjustment of the power amplifier phase and amplitude to reduce harmonics transmitted and optimize its adjacent channel leakage ratio (ACLR). Delays can be introduced to mitigate harmonics caused by the driver circuit or the amplifier circuit.

An envelope tracking bias signal 610 is generated as a function of the estimate spectral regrowth signal discussed above. The envelope tracking bias signal 610 adjusts a delay 620 between the driver circuit 352 and the amplifier circuit 356 so to reduce spectral regrowth during the amplification of the transmit signal. The time difference is controlled by a delay 620 that can be programmed or calibrated by the controller 318. In an exemplary embodiment, the delay is the propagation time from PA driver 352 to PA 356.

Bias adjustment to PA driver 352 is prior to the adjustment of PA 356 in order to further save energy. Pre-distortion corrections of phase and amplitude are introduced prior to the driver 352 and PA 356 to compensate for non-linearities. The feedback provided by the first feedback circuit 304 provides the sensing and corrections for the Pre-distortion corrections optimization. In one example, the mixer circuit 326 is a Harmonic Rejection Mixer (HRM). In another example, the mixer circuit 326 is a Single-ended Resistive Mixer (SRM). Non-Linear interference Cancelation (NLIC) corrections are generated as a function of the estimated spectral regrowth signal. The NLIC corrections include adjustments to an amplitude circuit 606 and a phase circuit 608. The amplitude and phase circuits operate to adjust the amplitude and phase of the transmit signal 602 before the transmit signal is supplied to the split PA 308. For example, the transmit signal 602 is input to the mixer 330. A correction signal 604 is input to the amplitude circuit 606 and the output of the amplifier circuit 606 is input to the phase circuit 608. The adjusted correction signal is then input to the mixer 330 to adjust the transmit signal prior to amplification by the driver 352. The correction signal 602 and its amplitude and phase adjustment are generated by the controller 318. For example, the controller 318 generates the control signals (C(n)) which comprise all the necessary control and adjustment signals.

Figure 7:
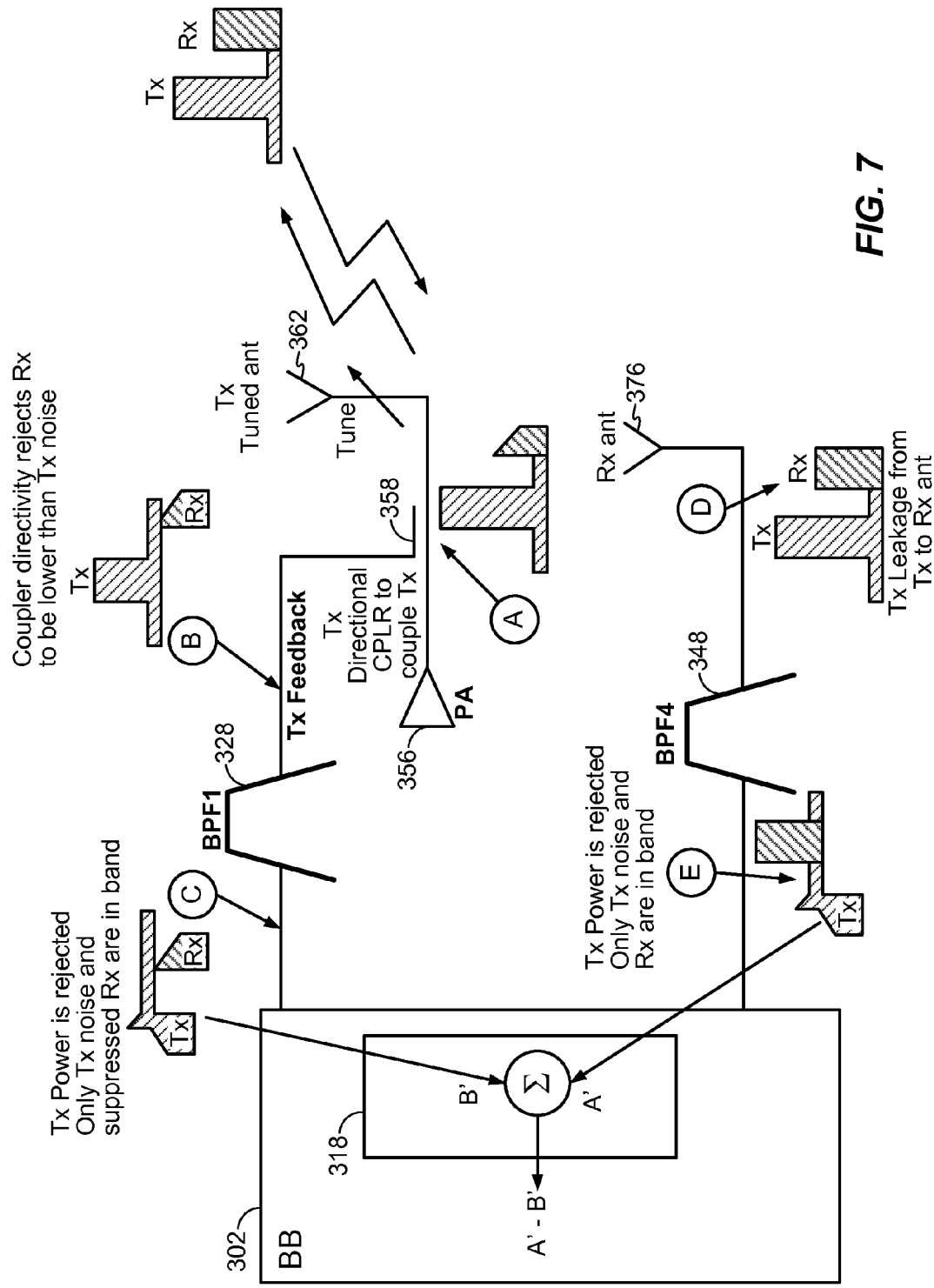
FIG. 7 shows a diagram illustrating the operation of the noise canceler shown in FIG. 3.

FIG. 7 shows a diagram illustrating the operation of the noise canceler shown in FIG. 3. As discuss above, a receive signal is received via transmit antenna 362. Initially, the received signal is rejected by the transmit antenna as it is tuned to the Tx band. The receive signal is also rejected by directional coupler 358 since it is coupled on the isolation path. However, the amplified signal (A) from amplifier 356 is not rejected, but directly coupled to filter 328. FIG. 7 shows that the energy from the amplified transmit signal present on the output of directional coupler 358 (B) is much greater than the energy from the received signal present on the output of directional coupler 358 since it is coupled on the isolation path and attenuated by the Tx antenna. FIG. 7 further illustrates that filter 328 is a bandpass filter centered at the receive frequency band and therefore rejects the majority of the transmit signal located within the transmit frequency band. The remaining transmit energy located within the receive frequency band (C) is received by baseband circuit 302.

Simultaneously, the receive signal and the transmit signal are received (D) on the receive antenna 376. FIG. 7 shows that the transmit signal has a great amplitude than the receive signal. This is because the transmit antenna is located within the same device as the receive antenna, while the base station transmitting to the mobile device is located many orders of magnitude further away. The received signals are both filtered by filter 348. In one example, filter 348 is a bandpass filter centered at the middle of the receive frequency. FIG. 7 illustrates that the majority of energy of the transmit signal located within the transmit frequency band is rejected by filter 348, and that only the transmit energy located within the receive frequency band (E) is passed to baseband circuit 302. The controller 318 within the baseband circuit 302 then subtracts the transmission noise (B') from the received signal (A') and outputs the difference.

In response to receiving both the digital Tx feedback signal (B') and the digital receive signal (A'), the controller 318 generates an adjusted receive signal (A'-B'). The adjusted receive signal is the received signal without an estimated amount of receiver noise introduced by the transmissions of the transceiver aria tunable transmit antenna 362. The combination of the amplification noise reduction factor, antenna isolation factor and noise cancellation factor combine to provide at least 30 dB of rejection of the amplified transmit signal in the receive band. In one example, the controller 318 is combinatory logic that performs a Boolean subtraction to generate the adjusted receive signal. In another example, the controller 318 is a processor that executes code to generate the adjusted receive signal.

In an exemplary embodiment, a mobile communication device includes a first amplifier to receive a transmit signal having a first amplification factor and to apply a second amplification factor to generate a first amplified transmit signal. The first and second amplification factors are set to obtain an amplification noise factor that determines a noise level of the first amplified transmit signal in a receive band. A dedicated transmit antenna is used to transmit the first amplified transmit signal. The dedicated transmit antenna is isolated from a receive antenna by an antenna isolation factor. A controller is configured to subtract a detection signal that represents the noise level of the first amplified transmit signal in the receive band from a receive signal that is received in the receive band by the receive antenna to obtain an adjusted receive signal. The controller provides a noise cancellation factor. The combination of the amplification noise reduction factor, antenna isolation factor and noise cancellation factor combine to provide at least 30 dB of rejection of the first amplified transmit signal in the receive band during transmission from the dedicated transmit antenna.

In another exemplary embodiment, a mobile communication device includes a driver circuit that generate a first signal, a first bandpass filter that receives the first signal and outputs a second signal, an amplifier circuit that receives the second signal and outputs a third signal, a transmit antenna that transmits the third signal, a coupler that receives the third signal and outputs a fourth signal, a second bandpass filter that receives the fourth signal and outputs a fifth signal, a receive antenna that receives a received signal, and a controller that receives the fifth signal and the received signal. The controller subtracts the fifth signal from the received signal and outputs an adjusted signal. The adjusted signal is the difference between the fifth signal and the received signal.

In another exemplary embodiment, up-converted baseband signals are mixed with a transmit signal received via a receive antenna to generate an estimated spectral regrowth signal. The estimated spectral regrowth signal is used to adjust the phase and amplitude of the transmit signals before a split amplifier so as to reduce spectral regrowth. The estimated spectral regrowth signal is also used to adjust the phase offset between a driver circuit and a power amplifier circuit in the split PA.

In yet another exemplary embodiment, a method of noise cancelling includes amplifying a first signal to generate a second signal, filtering the second signal to generate a third signal, amplifying the third signal to generate a fourth signal, transmitting the fourth signal from a transmit antenna, coupling the fourth signal while rejecting signals received from the transmit antenna to generate a fifth signal, filtering the fifth signal to generate a sixth signal, receiving a received signal from a receive antenna, and subtracting the sixth signal from the received signal to generate a noise canceled signal.

Figure 8:
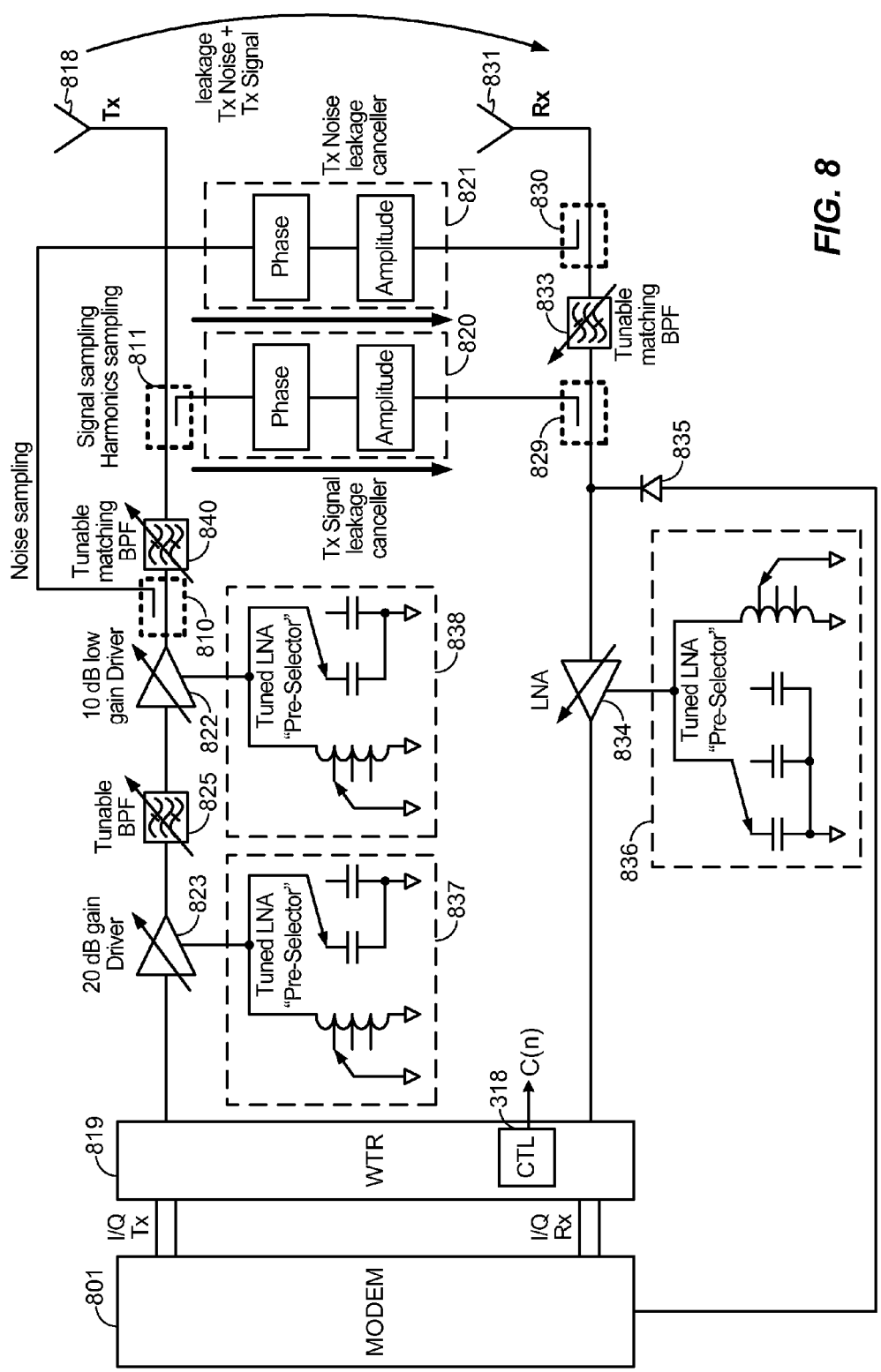
FIG. 8 shows an exemplary embodiment of a transmit signal leakage canceler and a transmit noise leakage canceler.

FIG. 8 shows an exemplary embodiment of a transmit signal leakage canceler 820 and a transmit noise leakage canceler 821. Baseband circuit 801 outputs baseband transmit signals to Wideband Transceiver (WTR) 819. In response, WTR 819 outputs an up-converted transmit signal to driver circuit 823. The BW and gain of driver circuit 823 is variable and controlled by control circuit 837. Baseband circuit 801 controls the switches included in control circuit 837.

The driver amplifier 823 is optimized to a bandwidth (BW) and center frequency of interest, which is the actual channel of transmission. As a consequence, the efficiency of driver amplifier 823 is improved due to optimal matching at its input and output. Moreover, undesired Tx noise is reduced and the Tx mask of the driver is improved. This means better signal drive to the PA 822. The amplified and delayed signal output by driver circuit 823 is filtered by filter 825. Filter 825 is a variable bandpass filter centered in the middle of the transmit frequency range.

Using inter-stage BPF 825 and split PA topology comprising driver 823, BPF 825, and PA 822, rather than a single Tx gain block, provides at the end result, better PA output mask, since the inter-stage filter 825 and the tuned driver 823 remove portion of Tx mask and noise. Moreover, it enables in some applications, relaxation of the output band pass filter 840 at the PA 822 output. Such relaxation, generally in rejection, turns to improve the filters insertion loss and therefore saves PA power and power consumption. In some other cases it may be such that there is no need for PA output filter since performances are improved significantly. This naturally saves power, reduces heat dissipation issues, and parts count.

The filtered output of filter 825 is amplified by amplifier circuit 822. The gain and BW of driver amplifier 823 is controlled by matching circuit illustrated by 837. The BW and gain of the power amplifier circuit 822 is variable and controlled by controlled by matching circuit 838. Baseband circuit 801 controls the circuits 837 and 838.

The power amplifier 822 is optimized to the BW and center frequency of interest, which is the actual channel of transmission. As a consequence, the efficiency of power amplifier is improved due to optimal matching at its input and output. Moreover, in this manner undesired Tx noise is reduced and Tx mask of PA is improved. This means better signal performance from PA 822 in terms of spectral regrowth, Tx noise is lower, efficiency is better, and heat dissipation is lower. The amplified output of amplifier circuit 822 is coupled to transmit noise leakage canceler 821 via coupler 810. The amplified output of amplifier 827 is also filtered by filter 840. The output of filter 840 is coupled to transmit signal leakage canceler 820 via coupler 811. The output of filter 840 is also connected to transmit antenna 818.

Transmit signal leakage canceler 820 includes a phase adjustment circuit and an amplitude adjustment circuit. Transmit noise leakage canceler 821 includes a phase adjustment circuit and an amplitude adjustment circuit. The output of the transmit noise leakage canceler 821 is coupled to the receive antenna 831 via coupler 830. The receive antenna 831 is connected to filter 833. The output of filter 833 is connected to LNA amplifier 834. The output of transmit signal leakage canceler 820 is also coupled to low noise amplifier 834 by coupler 829. The BW and gain of low noise amplifier 834 is variable and controlled by matching circuit 836. Baseband circuit 801 controls the switches included in the matching circuit 836. Thus, having tuned LNA 834 with its tuning network, illustrated as an example in 836, the LNA is optimized for optimal noise figure, matching and BW, which is the BW of channel of interest. As a result the LNA rejects out of band interferences in addition to the input filter 833. The lower optimal noise figure improves sensitivity. The optimal matching improves efficiency and better efficiency contributes to longer battery time.

A transmit signal energy detector 835 is also coupled to the output of filter 833 and its output is connected to baseband circuit 801 to be used as a meter for optimal setting and mum combine Tx energy measurement as for optimizing block 820. The output of low noise amplifier circuit 838 is coupled to WTR 819, which down-converts the received signal and provides the baseband received signal to baseband circuit 801.

The canceler describe above operates to sense the power of the PA information signal, for instance, block 820 senses the signal at the output of BPF 840 via a directional coupler 811. This way the PA signal sensing path is exclusively for the information signal since out-of-band Tx noise is suppressed by BPF 840. In order to control the level of the information signal, which is used for the controlled leakage path of block 820, there is an amplitude control arrangement. For proper phasor adding in the cancellation sum point there is a phase adjustment arrangement within block 820. The output of block 820 is coupled to LNA input via directional coupler 829. Thus, any Tx signal leaking between Tx antenna 818 to Rx antenna 831 is cancelled at the LNA input. For sensing the Tx WB noise, which is out of the Tx band and within the Rx band, block 821 is used. The noise energy is coupled prior to the BPF 840, which is attenuating this noise, via a directional coupler 810.

In order to control level of noise signal which is used for the controlled leakage path of block 821 there is an amplitude control arrangement. For proper phasor adding in the cancellation sum point there is a phase adjustment arrangement within block 821. There is an option to add a BPF within block 821 to prevent Tx signal effect. This can be done by using a BPF (not shown) which is identical in its pass band to the Rx BPF 833. Such BPF will pass the Tx noise only in a controlled leakage path. The output of block 821 is coupled to Rx input via directional coupler 830 prior BPF 833. The inherent Tx wide band noise coupled from Tx antenna 818 to Rx antenna 831 is cancelled at the BPF 833 input prior to the LNA and BPF 833 effects. The controlled leakage path is optimized by BB unit 801. Means to optimize the optimal setting of blocks 820 and 821 is provided by BB measurement of Rx EVM, SNR, BER, as an example. Further observability for leaking energy cancellation is provided by detector 835 that is used mainly for Tx signal leakage minima identification due to cancellation and setting of block 820. During operation, transmit signal energy detector 835 senses the minimum Direct Current (DC) due to transmit signal leakage summed with controlled leakage.

The Tx leakage is tuned by amplitude and phase via 820 and 821 paths in order to cancel the Tx to Rx leakage from Tx antenna to Rx antenna. This is because paths 820 and 821 are conducted leakage paths where in one we sense the Tx energy and in the other the Tx noise. In Tx noise sense path 821 we can add a BPF centered on the Rx frequency. This way the Tx noise is sensed and the Tx signal is rejected. Hence this is a controlled leakage used to cancel the off air uncontrolled Tx to Rx leakage. Hence, a minimum can be found by adjusting the two controlled paths. This is the optimal leakage cancellation. The detector output is averaged and sampled by ADC. The processing unit 801 based upon detector sensing on one hand and SNR of receiver on the other optimizes the two paths of controlled leakages. The transmit signal and noise leakage are canceled by baseband 801 adjusting the phase and gain of the paths 820 and 812 by way of the control circuits. In an exemplary embodiment, the controller 318 generates the control signals (C(n)) which comprise all the necessary control and adjustment signals.

Figure 9:
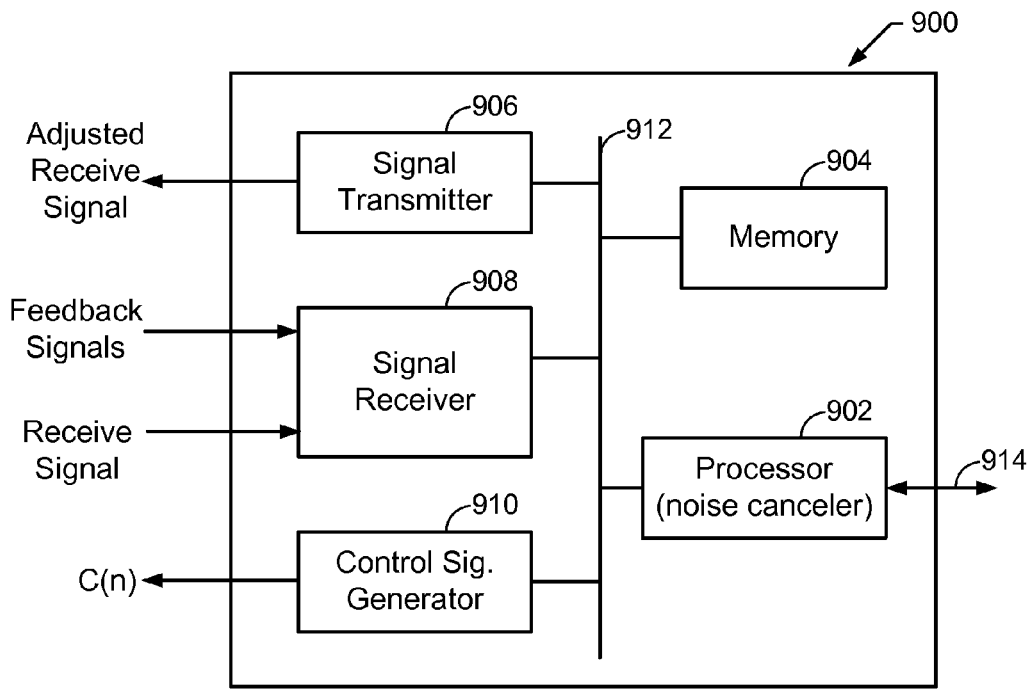
FIG. 9 shows an exemplary embodiment of a controller suitable for use in the noise canceler of FIG. 3.

FIG. 9 shows an exemplary embodiment of a controller 900 for use in exemplary embodiments of a noise canceler in a mobile communication device. For example, the controller 900 is suitable for use as the controller 318 shown in FIG. 3. The controller 900 comprises processor 902, memory 904, signal transmitter 906, signal receiver 908, and control signal generator 910 all coupled to communicate over bus 912.

The processor 902 comprises at least one of a CPU, processor, gate array, hardware logic, discrete circuits, memory elements, and/or hardware executing software. The processor 902 operates to control the other functional elements of the controller 900 using the bus 912. The processor 902 is also configured to communicate with other entities at the wireless device using the communication line 914. For example, the processor 902 may receive instructions, control information, configuration information, data, measurements or other information over the communication line 914. The processor 902 is configured to perform any type of signal processing and/or noise cancellation algorithm. For example, the processor 902 is configured to subtract a feedback signal (e.g., signal 392 or signal 396) from a received signal 394 to obtain an adjusted receive signal.

The memory 904 comprises any suitable memory or storage device that allows for storing, retrieving, and maintaining instructions and/or data associated with the operation of the controller 900. In an exemplary embodiment, the memory 904 stores algorithm instructions that can be executed by the processor 902 to perform the functions of noise cancellation as described herein.

The signal receiver 908 comprises hardware, such as amplifiers, buffers, registers, gates, analog to digital converters, digital to analog converters, or any other suitable hardware or discreet components and/or hardware executing software that operates to receive signals in a wireless transceiver. For example, the signal receiver 908 is configured to receive feedback signals, such as feedback signals 392 and 396 shown in FIG. 3. The signal receiver 908 is also configured to receive signals received from various wireless transmissions. For example, the signal receiver 908 is configured to receive the received signal 394 and/or the diversity signal 373 shown in FIG. 3. The signals received by the signal receiver can be stored in the memory 904 or directly processed by the processor 902. In an exemplary embodiment, the signal receiver 908 is configured to receive and process both analog and digital signals.

The signal transmitter 908 comprises hardware, such as amplifiers, buffers, registers, gates, analog to digital converters, digital to analog converters, or any other suitable hardware or discreet components and/or hardware executing software that operates to transmit an adjusted receive signal. For example, the processor 902 processes a received signal to subtract a feedback signal to produce an adjusted receive signal. The signal transmitter transmits the adjusted received signal to other entities at the wireless device. In an exemplary embodiment, the signal transmitter 906 is configured to transmit both analog and digital signals.

The control signal generator 910 comprises hardware, such as amplifiers, buffers, registers, gates, analog to digital converters, digital to analog converters, or any other suitable hardware or discreet components and/or hardware executing software that operates to generate control signals (C(n)) to control the various components of the exemplary embodiments of the noise canceler. For example, the processor 902 controls the control signal generator 910 to generate control signals (C(n)) that are configured to set amplification factors, control switches, adjust filters, and/or control any other type of circuits or functions of the noise canceler. In an exemplary embodiment, the control signal generator 910 is configured to generate and output both analog and digital signals.

Figure 10:
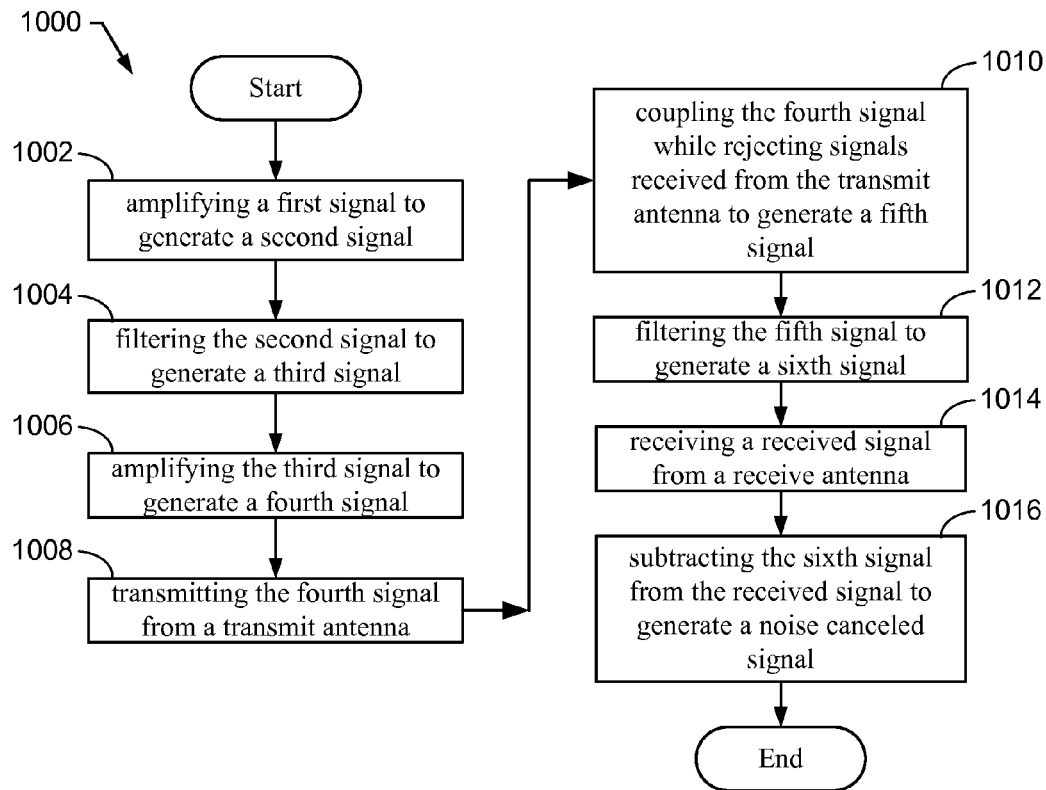
FIG. 10 shows an exemplary embodiment of a method for providing noise cancellation in a mobile communication device.

FIG. 10 shows an exemplary embodiment of a method 1000 for providing noise cancellation in a mobile communication device. For example, the method 1000 is suitable for use with the exemplary embodiments of a noise canceler shown in FIG. 3, in an exemplary embodiment, the processor 902 of the controller 318 operates to execute instructions in the memory 904 to perform the following operations.

At block 1002, a first signal is amplified to generate a second signal. For example, the signal 380 is amplified by the driver amplifier 352 to generate the second signal.

At block 1004, the second signal is filtered to provide a third signal. In an exemplary embodiment, the second signal is filtered by the filter 354 to provide the third signal.

At block 1006, the third signal is amplified to generate a fourth signal. In an exemplary embodiment, the third signal is amplified by the amplifier 356 to generate the fourth signal.

At block 1008, the fourth signal is transmitted from a transmit antenna. In an exemplary embodiment, the signal at the output of the amplifier 356 is transmitted by the transmit antenna 362.

At block 1010, a fifth signal is coupled from the fourth signal while rejecting signals received from the transmit antenna. In an exemplary embodiment, the directional coupler 358 provides the signal 384 while rejecting signals flowing from the antenna 362.

At block 1012, the fifth signal is filtered to generate a sixth signal. In an exemplary embodiment, the signal 384 is filtered by the filter 328 to provide the signal 386.

At block 1014, a received signal is received from a receive antenna. In an exemplary embodiment, the signal 391 is received by the receive antenna 376.

At block 1016, the sixth signal is subtracted from the received signal to generate a noise canceled signal. In an exemplary embodiment, the controller 318 operates to substrate the signal 392 from the received signal 394 to produce the noise canceled signal 389.

Therefore, the method 1000 operates to perform noise cancelling in a wireless device. It should be noted that the method 1000 is exemplary and that other methods may be implemented. For example, the operation of the method may be modified, changed, rearranged or otherwise reconfigured such that other methods are possible within the scope of the disclosed embodiments.

Figure 11:
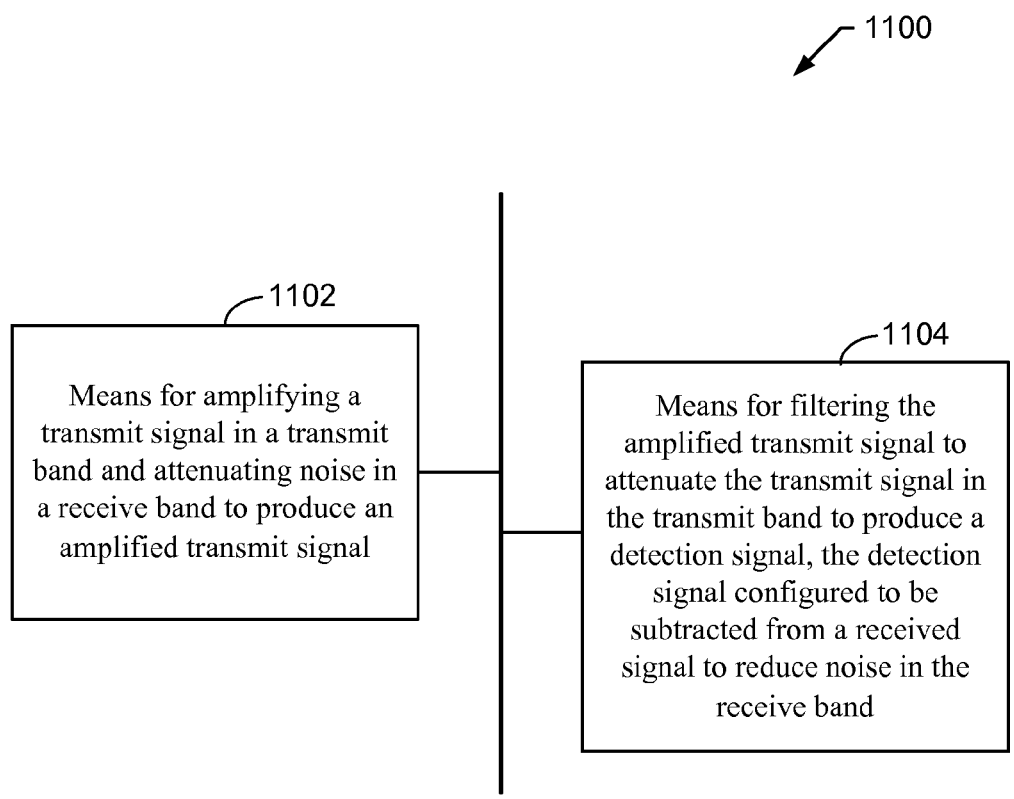
FIG. 11 shows an exemplary embodiment of a noise canceler for use in a mobile communication device.

FIG. 11 shows an exemplary embodiment of an apparatus 1100 to provide noise canceling in a wireless device. For example, the apparatus 1100 is suitable for use as the noise canceler 116 shown in FIG. 1. The noise canceler 1100 includes a first means (1102) for amplifying a transmit signal in a transmit band and attenuating noise in a receive band to produce an amplified transmit signal, which in an exemplary embodiment comprises the split PA 306 shown in FIG. 3. The apparatus 1100 also comprises a second means (1104) for filtering the amplified transmit signal to attenuate the transmit signal in the transmit band to produce a detection signal, the detection signal configured to be subtracted from a received signal to reduce noise in the receive band, which in an exemplary embodiment comprises the first feedback circuit 304 shown in FIG. 3.

The amplifiers, filters, couplers and diplexers described herein may be implemented on an IC, an analog IC, an RFIC, a mixed-signal IC, an ASIC, a printed circuit board (PCB), an electronic device, etc. The amplifiers, filters, couplers and diplexers may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing a noise canceler described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but the disclosure is to be accorded the widest scope consistent with the principles and novel features disclosed herein.

What is claimed is:

1. An apparatus comprising:
   a split amplifier to amplify a transmit signal in a transmit band and attenuate noise in a receive band to produce an amplified transmit signal, the split amplifier comprising a driver amplifier to amplify the transmit signal to generate an amplified first signal, a first filter to filter the amplified first signal to attenuate signals in the receive band to provide a filtered amplified first signal, and a power amplifier to amplify the filtered amplified first signal to generate the amplified transmit signal; and
   a feedback circuit coupled to the split amplifier to filter the amplified transmit signal to attenuate the transmit signal in the transmit band to produce a detection signal, the detection signal to be subtracted from a received signal to reduce noise in the receive band.

2. The apparatus of claim 1, further comprising a diplexer that receives the amplified transmit signal.

3. The apparatus of claim 1, the feedback circuit comprising:
a coupler coupled to the split amplifier to obtain the amplified transmit signal; and
a second filter to filter the amplified transmit signal to produce the detection signal.

4. The apparatus of claim 3, the coupler configured as a directional coupler that attenuates signals flowing in a direction opposite to the amplified transmit signal.

5. The apparatus of claim 1, further comprising:
a second feedback circuit to receive the transmit signal and the received signal to generate a second detection signal to be subtracted from the received signal to reduce noise in the receive band.

6. The apparatus of claim 5, the second feedback circuit further comprising:
a first directional coupler to provide a coupled version of the transmit signal;
a second directional coupler to provide a coupled version of the received signal; and
a mixer that mixes the coupled version of the transmit signal and the coupled version of the received signal to generate a spectral re-growth signal to be subtracted from the received signal to reduce noise in the receive band.

7. The apparatus of claim 1, further comprising
a second split amplifier to amplify a second transmit signal in the transmit band and attenuate noise in the receive band to produce a second amplified transmit signal.

8. The apparatus of claim 7, further comprising
a diplexer to combine the amplified transmit signal and the second amplified transmit signal to produce an antenna signal, the diplexer having an insertion loss of less than 2 dB.

9. The apparatus of claim 1, the split amplifier and the feedback circuit combine to provide at least 20 dB of attenuation of noise in the receive band.

10. The apparatus of claim 1, wherein a total insertion loss of devices connected between an output of the split amplifier and an external transmit antenna is less than 2 dB.

11. The apparatus of claim 1, wherein the subtraction of the detection signal from the received signal is performed by a noise canceler.

12. A method, comprising:
amplifying a first signal in a transmit band to generate a second signal;
filtering the second signal to attenuate signals in a receive band to generate a third signal;
amplifying the third signal to generate a fourth signal;
coupling the fourth signal to produce a fifth signal;
filtering the fifth signal to attenuate signals in the transmit band to generate a sixth signal;
receiving a seventh signal; and
subtracting the sixth signal from the seventh signal to reduce noise in the receive band.

13. The method of claim 12, the subtracting generates a noise canceled signal having at least 20 dB of attenuation of noise in the receive band when compared to the seventh signal.

14. The method of claim 12, wherein the amplifying the first signal is performed by a driver circuit, the filtering the second signal is performed by a first bandpass filter, the amplifying the third signal is performed by an amplifier, the coupling the fourth signal is performed by a directional coupler, the filtering the fifth signal is performed by a second bandpass filter, and the subtracting the sixth signal is performed by a noise canceler.

15. The method of claim 12, wherein the first signal is a Radio Frequency (RF) signal, and wherein the RF signal is an up-converted version of an analog baseband signal.

16. The method of claim 12, wherein the subtracting the sixth signal further comprises:
converting the sixth signal to a first digital signal;
converting the seventh signal to a second digital signal; and
subtracting the first digital signal from the second digital signal using digital logic.

17. The method of claim 12, the sixth signal being a detection signal that represents a noise level of the fifth signal in the receive band.

18. An apparatus comprising:
means for amplifying a transmit signal in a transmit band and attenuating noise in a receive band to produce an amplified transmit signal, the means for amplifying a transmit signal comprising means for amplifying the transmit signal to generate an amplified first signal, means for filtering the amplified first signal to attenuate signals in the receive band to provide a filtered amplified first signal, and means for amplifying the filtered amplified first signal to generate the amplified transmit signal; and
means for filtering the amplified transmit signal to attenuate the transmit signal in the transmit band to produce a detection signal, the detection signal to be subtracted from a received signal to reduce noise in the receive band.

19. The apparatus of claim 18, further comprising
means for subtracting the detection signal from the received signal to produce a noise canceled signal having at least 20 dB of attenuation of noise in the receive band when compared to the received signal.

* * * * *